(12) United States Patent
Lee et al.

(10) Patent No.: US 9,093,097 B1
(45) Date of Patent: Jul. 28, 2015

(54) AMMONITE SERVO REFERENCE PATTERN WRITING FOR HEAT-ASSISTED MAGNETIC RECORDING

(71) Applicant: Seagate Technology LLC, Cupertino, CA (US)

(72) Inventors: ChungWoo Lee, Suwon (KR); SangHan Lee, Dongjak-gu (KR); JiHoon Lee, Wonju-si (KR)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/616,231

(22) Filed: Feb. 6, 2015

(51) Int. Cl.
*G11B 5/596* (2006.01)
*G11B 5/00* (2006.01)

(52) U.S. Cl.
CPC ........ *G11B 5/59661* (2013.01); *G11B 5/59666* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 5,668,679 A | 9/1997 | Swearingen et al. | |
| 6,429,989 B1 | 8/2002 | Schultz et al. | |
| 6,507,450 B1 | 1/2003 | Elliott | |
| 6,519,107 B1 | 2/2003 | Ehrlich et al. | |
| 6,600,620 B1 | 7/2003 | Krounbi et al. | |
| 6,930,846 B2 * | 8/2005 | Nakamura | 360/46 |
| 6,934,103 B2 * | 8/2005 | Chickanosky et al. | 360/75 |
| 7,106,548 B2 * | 9/2006 | Ehrlich | 360/77.08 |
| 7,119,990 B2 * | 10/2006 | Bajorek et al. | 360/128 |
| 7,158,336 B2 | 1/2007 | Chan et al. | |
| 7,190,545 B2 | 3/2007 | Chan et al. | |
| 7,209,312 B1 | 4/2007 | Sutardja | |
| 7,365,928 B2 * | 4/2008 | Venca et al. | 360/46 |
| 7,423,831 B2 | 9/2008 | Gami et al. | |
| 7,468,856 B2 * | 12/2008 | Fitzpatrick et al. | 360/75 |
| 7,508,616 B2 * | 3/2009 | Fitzpatrick et al. | 360/75 |
| 7,522,369 B1 * | 4/2009 | Rahgozar et al. | 360/75 |
| 7,580,216 B1 | 8/2009 | Han et al. | |
| 7,688,539 B1 | 3/2010 | Bryant et al. | |
| 8,570,842 B1 * | 10/2013 | Richter et al. | 369/13.02 |
| 8,687,308 B1 | 4/2014 | Katchmart | |
| 2006/0209445 A1 * | 9/2006 | Yamasaki et al. | 360/46 |
| 2007/0206314 A1 * | 9/2007 | DeRosa et al. | 360/75 |

* cited by examiner

*Primary Examiner* — Wayne Young
*Assistant Examiner* — James L Habermehl
(74) *Attorney, Agent, or Firm* — Taylor English Duma LLP (57) ABSTRACT

Technologies are described herein for writing servo reference patterns in a storage device implementing heat-assisted magnetic recording. A recording signal for the servo reference patterns is generated through a read/write channel to a read/write head of the storage device. The read/write head is moved across a recording surface of a disk in the storage device as the disk is rotated and an intermittent signal is applied to a write gate interposed between the read/write channel and the read/write head so that a maximum continuous writing time of the recording signal does not exceed a continuous write time limit of the storage device.

20 Claims, 6 Drawing Sheets

AMMONITE SERVO REFERENCE PATTERN WRITING FOR HEAT-ASSISTED MAGNETIC RECORDING

BRIEF SUMMARY

The present disclosure relates to technologies for writing servo reference patterns in a storage device implementing heat-assisted magnetic recording. According to some embodiments, a method for writing servo reference patterns to the recording surface of a disk in the storage device comprises generating a recording signal for a servo reference pattern through a read/write channel to a read/write head of the storage device. The read/write head is moved across the recording surface as the disk is rotated and an intermittent signal is applied to a write gate interposed between the read/write channel and the read/write head so that a maximum continuous writing time of the recording signal does not exceed a continuous write time limit of the storage device.

According to further embodiments, a servo track writing device comprises a processor and a memory. The memory contains a servo writer module configured to generate a recording signal for a servo reference pattern through a read/write channel of a hard disk drive ("HDD") apparatus to a read/write head, the HDD apparatus implementing heat-assisted magnetic recording. The read/write head is moved across a recording surface of a disk in the HDD apparatus as the disk is rotated, and an intermittent signal is applied to a write gate interposed between the read/write channel and the read/write head so that a maximum continuous writing time of the recording signal does not exceed a HAMR continuous write time limit of the HDD apparatus.

According to further embodiments, a computer-readable medium has processor-executable instructions stored thereon that, when executed by a processor operably connected to a storage device, cause the processor to generate a recording signal for a servo reference pattern through a read/write channel of the storage device to a read/write head of the storage device. The read/write head is moved across a recording surface of a disk of the storage device as the disk is rotated, and an intermittent signal is applied to a write gate interposed between the read/write channel and the read/write head so that a maximum continuous writing time of the recording signal does not exceed a continuous write time limit of the storage device.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The following detailed description is directed to technologies for writing servo reference patterns in a storage device, such as a hard-disk drive ("HDD") apparatus, implementing heat-assisted magnetic recording technology. A conventional offline ammonite servo track writer ("OASTW") writes spiral servo reference patterns, referred to herein as "ammonite reference patterns," to the recording surface of each disk by sending a reference signal to a corresponding recording head while the head is swept across the surface as the disk rotates. The spiral patterns are then utilized as references for writing final servo information to the media.

Due to the linear length of the ammonite reference patterns, however, the write time required for a single reference pattern may exceed the maximum continuous write time for a recording head in HDD apparatuses implementing heat-assisted magnetic recording ("HAMR") technology. HAMR utilizes a small laser in conjunction with a magnetic recording head to heat a portion of the recording surface to which data is currently being written. This heating changes the magnetic properties of the disk surface by reducing or removing the superparamagnetic effect for a short time while writing takes place. HAMR allows for higher areal density capacity ("ADC") of the recording surface(s), but also introduces a limit to continuous write time due to the characteristics of HAMR writing. For example, the continuous heating may change the reference patterns written to the disk surface during the lengthy write-time required for the ammonite reference patterns.

Because the time required for writing an ammonite reference pattern may exceed the continuous write time limit for HAMR, a new pattern writing method for OASTW is needed. According to embodiments described herein, an OASTW methods may be implemented that write the ammonite reference patterns in an intermittent fashion such that the continuous write time of the pattern does not exceed the HAMR continuous write time limit. The new writing method divides the ammonite reference patterns into segments of writable length with no adverse thermal effects from the laser of the HAMR recording head. In addition, the methods described herein may be applied to the read/write channel architecture of an HDD apparatus implementing HAMR technology with no change to the existing hardware.

Figure 1:
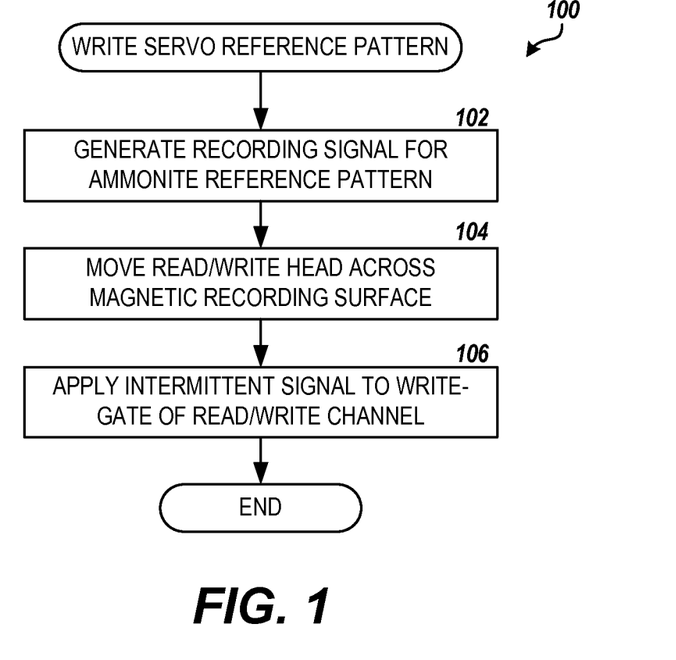
FIG. 1 is a flow diagram showing one routine for writing servo reference patterns in a storage device implementing heat-assisted magnetic recording, according to embodiments described herein.

FIG. 1 illustrates one routine 100 for writing servo reference patterns in a storage device implementing heat-assisted magnetic recording. According to some embodiments, the routine 100 may be performed for an HDD apparatus in conjunction with a servo writing process during manufacture and/or initial configuration of the device. The routine 100 includes step 102, where a write signal is generated through a read/write head associated with a magnetic recording surface of a disk in the HDD apparatus. The write signal may be generated by a digital signal processor in a controller of the HDD apparatus and may comprise a repeating 2T or 4T data pattern, for example. The write signal pattern is designed such that it generates a recognizable signal in the device's servo system when the pattern is crossed by the read/write head during subsequent servo writing processes for the recording surface. The crossing signal is utilized to accurately write the servo sectors/wedges to the correct location on the recording surface of the disk.

From step 102, the routine 100 proceeds to step 104, where the read/write head is moved across the magnetic recording surface at a constant velocity. In some embodiments, the read/write head may be moved by an actuator, such as a voice-coil motor ("VCM"), in the HDD apparatus in order to sweep the head across the disk surface. In further embodiments, the read/write head may be moved by an actuator or device external to the HDD apparatus. Coupled with the rotation of the disk, the sweeping motion results in the read/write head making a spiral pattern across the magnetic recording surface, as will be described in more detail below. While the read/write head is moved across the disk, an intermittent signal is applied to the write-gate interposed between the read/write channel and the read/write head, as shown at step 106, such that the pattern is not written of a length that exceeds the HAMR continuous write time limit. From step 106, the routine 100 ends.

Figure 2:
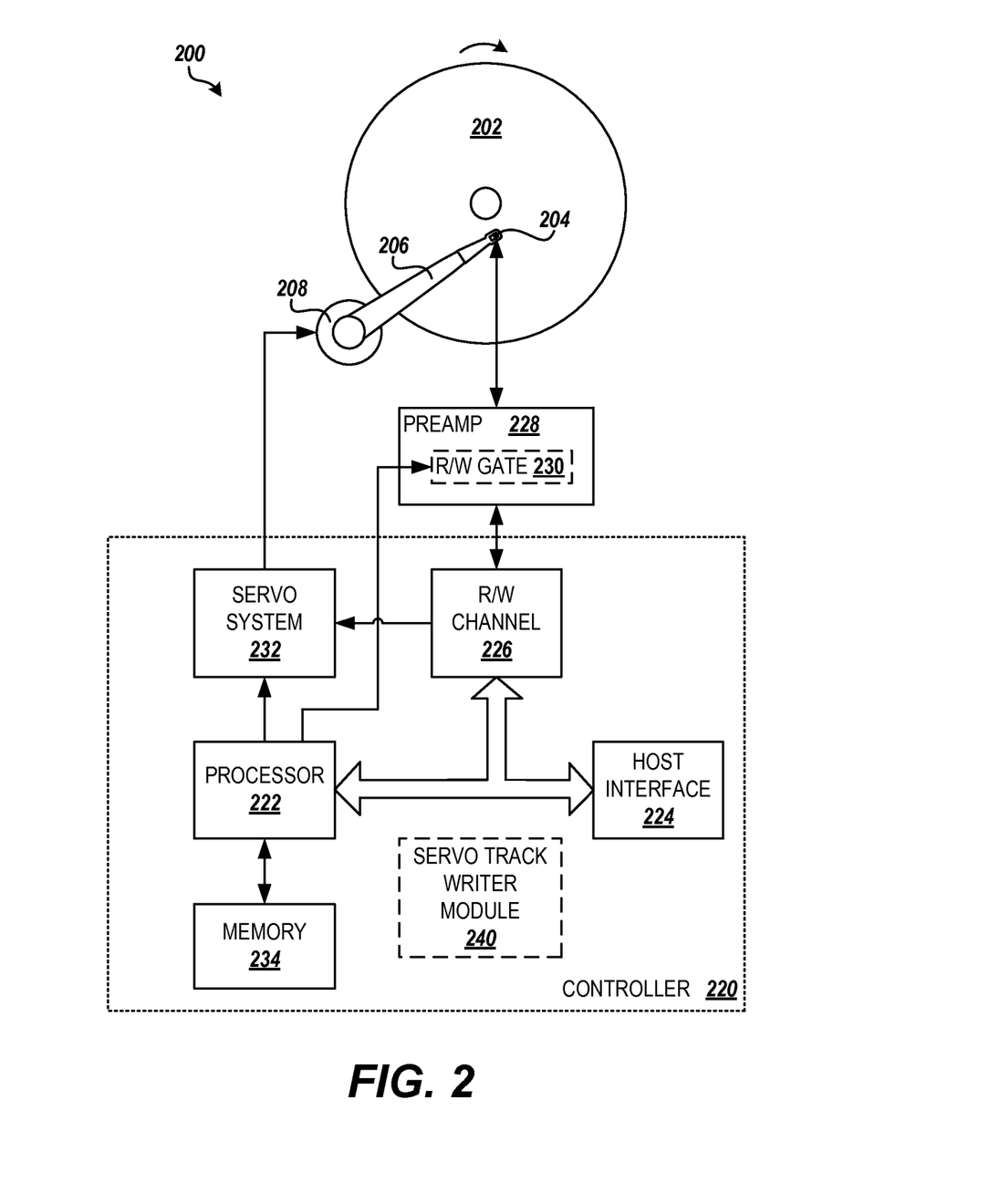
FIG. 2 is a block diagram showing an illustrative environment for writing servo reference patterns in a storage device implementing heat-assisted magnetic recording in a storage device, according to embodiments described herein.

FIG. 2 and the following description are intended to provide a general description of a suitable environment in which the embodiments described herein may be implemented. In particular, FIG. 2 shows an illustrative storage device 200, such as an HDD apparatus, along with hardware, software and components for writing servo reference patterns in a storage device implementing heat-assisted magnetic recording, according to the embodiments provided herein. The storage device 200 may include recording media comprising at least one platter or disk. Each disk may include one or two magnetic recording surfaces 202. For operation of the storage device 200, the recording surface 202 may be divided or "formatted" into a number of individual data tracks representing substantially concentric circular areas on the surface where user data is stored.

The storage device 200 further includes at least one read/write head 204 associated with and located adjacent to each recording surface 202. The read/write head 204 may read information from the recording surface 202 by sensing a magnetic field formed on portions of the surface of the disk, and may write information by magnetizing a portion of the recording surface of the disk. The read/write head 204 may be located at the distal end of an arm 206 that is rotated by a VCM or other actuator 208 in order to position the read/write head 204 over locations on the recording surface 202 for a read or write operations. According to embodiments, the read/write head 204 includes writer elements and other components for utilizing HAMR for recording information to the recording surface 202, including a laser heat source, focusing structures, and the like. The read/write head 204 may further incorporate other components, including magneto-resistive ("MR") reader elements, tunneling MR reader elements, writer shields, head heaters, sliders, and the like.

The storage device 200 may further comprise a controller 220 that controls the operations of the storage device. The controller 220 may include a processor 222. The processor 222 may implement an interface 224 allowing the storage device 200 to communicate with a host device, other parts of the storage device 200, or other components, such as a server computer, personal computer ("PC"), laptop, tablet, game console, set-top box or any other electronics device that can be communicatively coupled to the storage device 200 to store and retrieve data from the storage device. The processor 222 may process write commands from the host device by formatting the associated data and transferring the formatted data via a read/write channel 226 through the read/write head 204 and to the recording surface 202 of the disk. The processor 222 may further process read commands from the host device by determining the location of the desired data on the recording surface 202, positioning the read/write head(s) 204 over the determined location, reading the data from the surface via the read/write channel 226, correcting any errors and formatting the data for transfer to the host device. The read/write head 204 may be positioned to read or write data to one or more locations on a target data track on the on the recording surface 202 of the disk by moving the read/write head 204 radially across the tracks using the actuator 208 while a spindle motor rotates the disk to bring the target location(s) under the read/write head.

The read/write channel 226 may convert data between the digital signals processed by the processor 222 and the analog read and write signals conducted through the read/write heads 204 for reading and writing data to the recording surfaces 202 of the disks. The analog signals to and from the read/write heads 204 may be further processed through a preamplifier 228. The preamplifier 228 may incorporate a read/write gate circuit 230 that allows the controller to control read operations from and write operations to each read/write head 204 and associated recording surfaces 202. For example, the read/write gate circuit 230 may include a write gate that when open enables writing of signals from the read/write channel 226 to the recording surface 202 through the read/write head 204.

In order to provide for accurate positioning of the read/write heads 204 over target data track(s) on the recording surface 202 during read and write operations, the controller may further include a servo system 232. The servo system 232 may utilize the servo data from the read/write channel 226 along with reference signals from the processor to position the read/write head 204 over a target data track on the recording surface 202 and maintain the position of the head substantially over the center of the target track throughout a read or write operation. The servo system 232 may comprise hardware circuits in the controller 220, processor-executable instructions for execution in the processor 222, or any combination of these and other components of the storage device 200.

The servo data from the read/write channel 226 may be generated by servo patterns detected on the recording surface(s) 202 of the disks during read or write operations. The servo patterns may be written to the recording surfaces 202 during manufacture and/or initial configuration of the storage device 200. For example, the servo patterns may include concentric servo sectors or "wedges" recorded around the circumference of each data track. Each servo sector may comprise patterns and data allowing for proper gain adjustment and timing synchronization of read signals and centerline tracking of a target data track during read or write operations.

The controller 220 may further include a computer-readable recording medium or "memory" 234 for storing processor-executable instructions, data structures and other information. The memory 234 may comprise a non-volatile memory, such as read-only memory ("ROM") and/or FLASH memory, and a random-access memory ("RAM"), such as dynamic random access memory ("DRAM") or synchronous dynamic random access memory ("SDRAM"). The memory 234 may further comprise a portion of the storage media of the storage device 200, such as the maintenance cylinder ("M/C") of the disk. For example, the memory 234 may store a firmware that comprises commands and data necessary for performing the operations of the storage device 200. In some embodiments, the memory 234 may store processor-executable instructions that, when executed by the processor 222, perform the routine 100 for writing servo reference patterns in a storage device, as described herein.

In addition to the memory 234, the environment may include other computer-readable media storing program modules, data structures, and other data described herein for writing servo reference patterns in a storage device. It will be appreciated by those skilled in the art that computer-readable media can be any available media that may be accessed by the controller 220 or other computing system for the non-transitory storage of information. Computer-readable media includes volatile and non-volatile, removable and non-removable recording media implemented in any method or technology, including, but not limited to, RAM, ROM, erasable programmable ROM ("EPROM"), electrically-erasable programmable ROM ("EEPROM"), FLASH memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

In further embodiments, the environment may include a servo track writer module 240. The servo track writer module 240 may write the ammonite servo reference patterns to the recording surfaces 202 of the storage device 200 utilizing the methods described herein. In addition, the servo track writer module 240 may write the final servo patterns (e.g., servo sectors/wedges) to the recording surfaces 202 utilizing the ammonite reference patterns for precision placement.

According to some embodiments, the servo track writer module 240 may be implemented in the controller 220 as software, hardware, or any combination of the two. For example, the servo track writer module 240 may be stored in the memory 230 as part of the firmware of the storage device 200 and may be executed by the processor 222 during manufacture and/or initial configuration of the device for writing the ammonite reference patterns as described herein. This may be the case in an HDD apparatus configured for self-servo track writing ("SSTW"). The servo track writer module 240 may alternatively or additionally be stored in other computer-readable media accessible by the controller 220. In further embodiments, the servo track writer module 240 may be implemented in a computing system external to and operably connected to the storage device 200, such as in a testing/configuration system utilized to perform initial configuration and testing of the storage device, for example. The servo track writer module 240 may further be stored in a memory or other computer-readable media accessible by the testing/configuration system and be executed by a processor of the testing/configuration system.

It will be appreciated that the structure and/or functionality of the storage device 200 may be different than that illustrated in FIG. 2 and described herein. For example, the processor 222, read/write channel 226, servo system 232, memory 234 and other components and circuitry of the storage device 200 may be integrated within a common integrated circuit package or distributed among multiple integrated circuit packages. Similarly, the illustrated connection pathways are provided for purposes of illustration and not of limitation, and some components and/or interconnections may be omitted for purposes of clarity. It will be further appreciated that the storage device 200 may not include all of the components shown in the FIG. 2, may include other components that are not explicitly shown in the figure or may utilize an architecture completely different than that shown in the figure.

Figure 3:
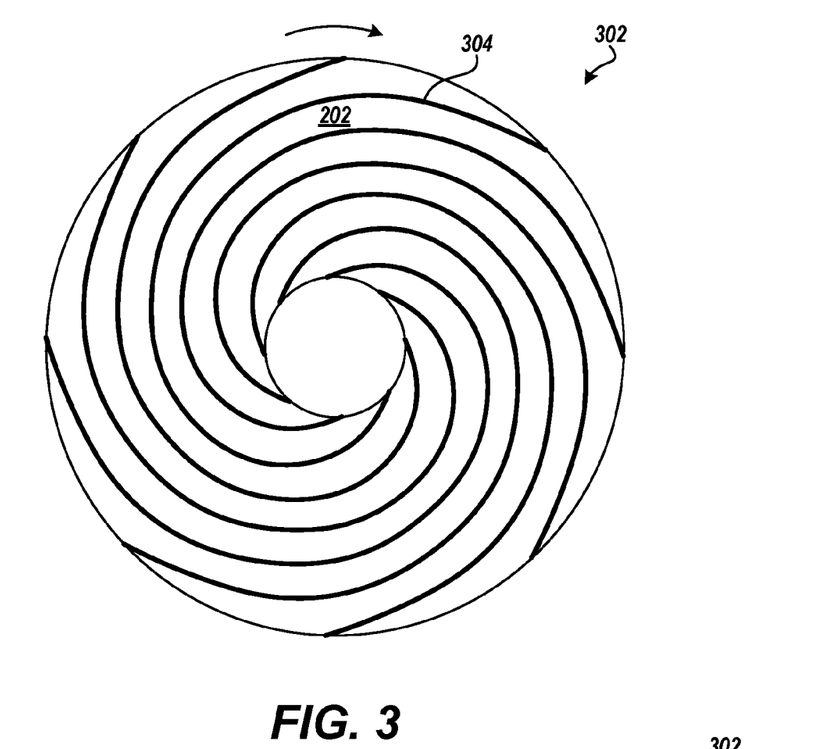
FIGS. 3 and 4 are block diagrams showing an illustrative layout of ammonite servo reference patterns written to the disk media, according to embodiments described herein.

FIG. 3 shows illustrative ammonite reference patterns 302 written by a conventional OASTW to a recording surface 202 of a disk in a storage device 200. According to some embodiments, the ammonite reference patterns 302 may comprise multiple, continuous ammonite cycles, such as ammonite cycle 304, written from an outer diameter of the recording surface 202 to an inner diameter of the surface as the disk rotates underneath the read/write head 204, forming a spiral line or track on the recording surface. It will be appreciated that more or less ammonite cycles 304 may be written to the recording surface 202 than shown in the figure, and that the geometry of the ammonite reference patterns 302 shown is for illustrative purposes only. It will be further appreciate that a single ammonite cycle 304 may be written over multiple rotations of the disk, forming a spiral pattern significantly longer in length than that of the concentric data tracks formatted on the recording surface 202. Disregarding the circular geometry of the recording surface 202 and accounting for the rotation of the disk and movement of the read/write head 204 across the recording surface 202 during pattern writing, the ammonite reference patterns 302 shown in FIG. 3 may be alternately illustrated as shown in FIG. 4.

Figure 5:
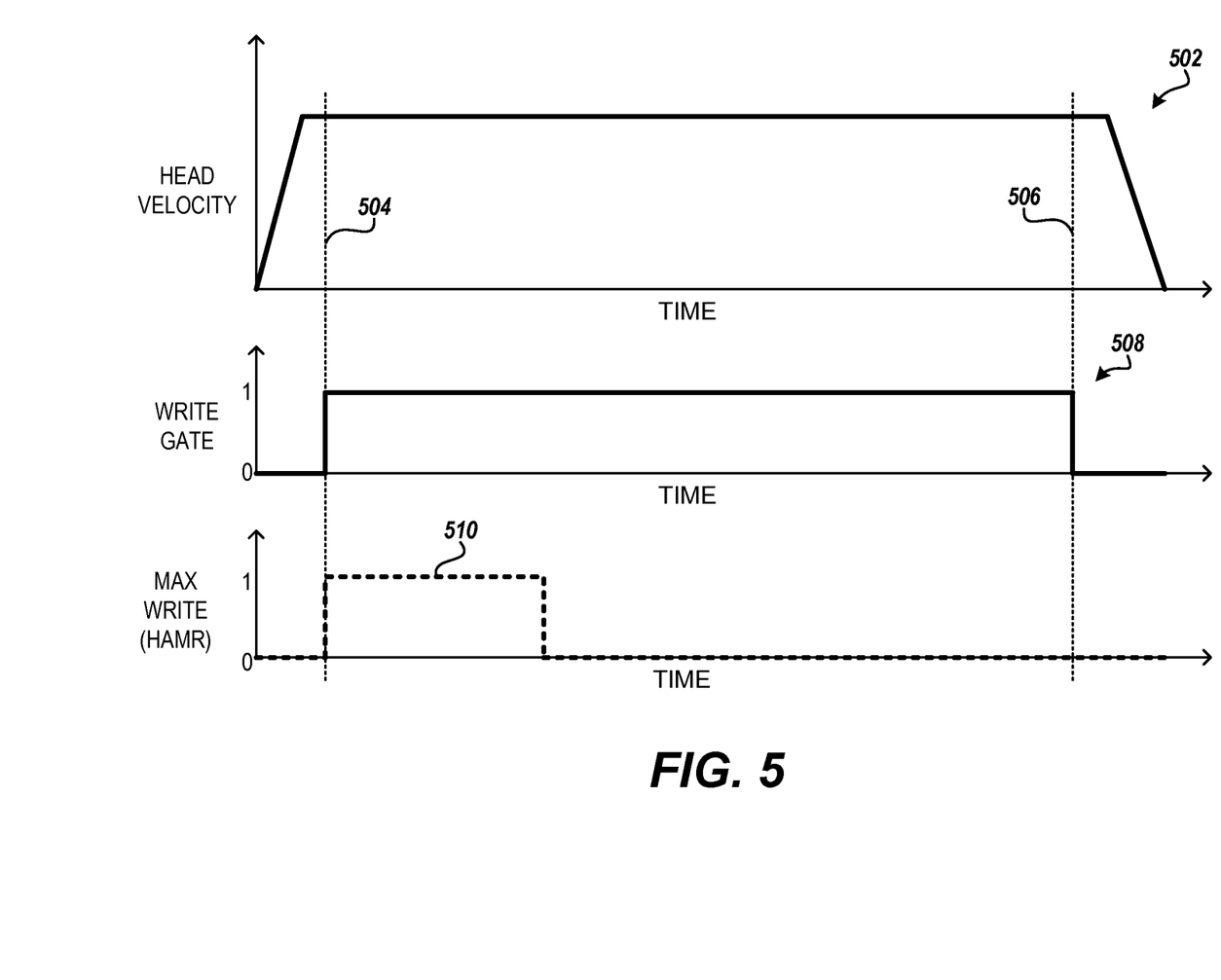
FIG. 5 is a timing diagram showing aspects of the ammonite servo reference pattern writing process, according to embodiments described herein.

FIG. 5 shows the velocity profile 502 for the read/write head 204 during the writing of the ammonite reference patterns 302, according to embodiments. As described above, the read/write head 204 may be moved at a constant velocity from the outer diameter of the recording surface 202 to the inner diameter of the surface during the ammonite reference pattern writing process utilizing the VCM or other actuator 208 while the disk rotates underneath the head. As shown in the velocity profile 502, the read/write head 204 may require some time to reach the constant velocity before pattern writing begins. Writing of each ammonite cycle 304 occurs between the times indicated at 504 and 506 in the velocity profile 502.

Figure 4:
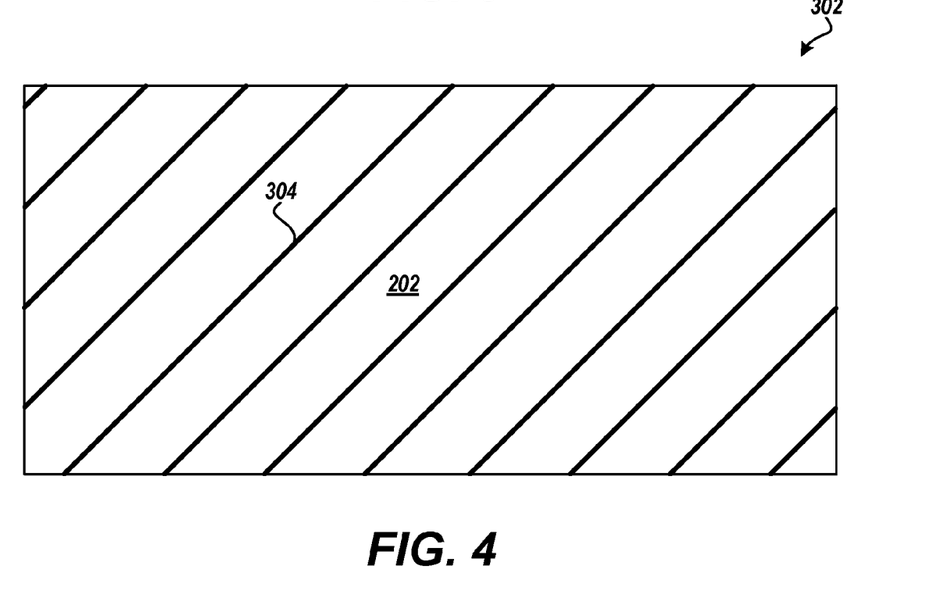

As further shown in the timing diagram of FIG. 5, a signal 508 is applied to the write gate 230 of the preamplifier 228 such that the write gate is opened during the entire write of the ammonite cycle 304 enabling the signal pattern provided to the read/write channel 226 to be written to the recording surface 202 of the disk in a continuous spiral line or track, as shown in FIGS. 3 and 4. The HAMR continuous write time limit is also shown at 510 in the timing diagram of FIG. 5. As may be seen in the figure, the write gate open time for writing the ammonite cycle 304 generally exceeds the HAMR continuous write time limit 510. For example, the write time for an ammonite cycle may be approximately 300 ms. while the HAMR continuous write time limit 510 may be under 10 ms. Therefore, it may be seen that ammonite reference patterns 302 comprising continuous ammonite cycles 304 written by a conventional OASTW may not be utilized in a storage device 200 implementing HAMR.

Figure 6:
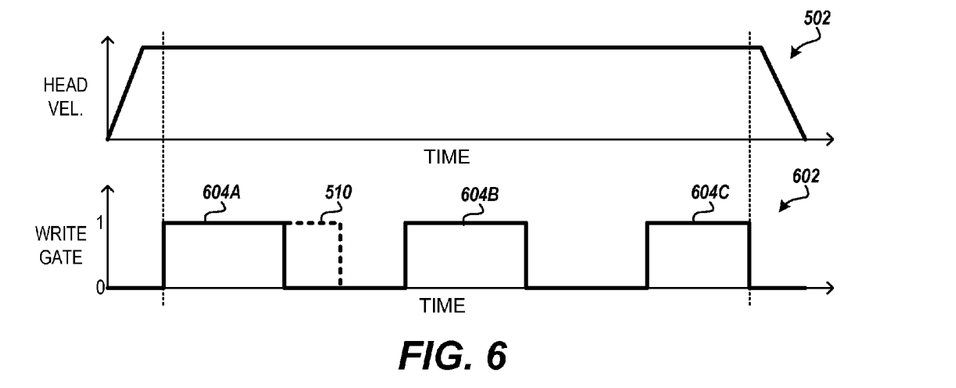
FIG. 6 is a timing diagram showing aspects of one method for writing servo reference patterns in a storage device implementing heat-assisted magnetic recording, according to embodiments described herein.
Figure 7:
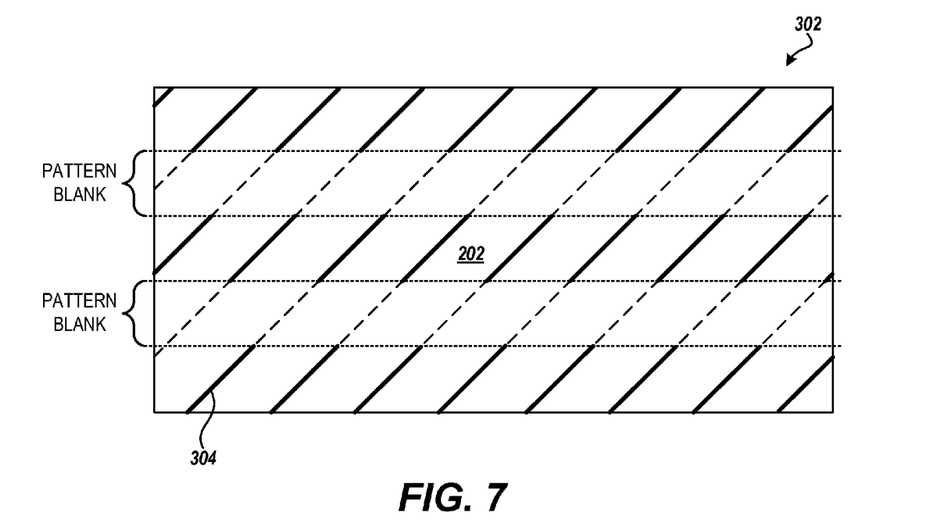
FIG. 7 is a block diagram showing an illustrative layout of ammonite servo reference patterns written to the disk media utilizing methods described herein.

FIG. 6 shows a timing diagram for the write gate 230 for writing ammonite reference patterns 302 utilizing the ammonite reference pattern writing methods described herein. According to some embodiments, an intermittent signal 602 is applied to the write gate 230 of during the write of the ammonite cycles 304, resulting in each ammonite cycle not being continuous but consisting of a number of segments where the pattern is blank, as may be seen in FIG. 7. Each open period of the write gate, as shown at 604A-604C in FIG. 6, is shorter than the HAMR continuous write time limit 510, and thus the ammonite reference pattern writing process illustrated may be used in storage devices 200 implementing HAMR. It will be appreciated that the number and length of the intermittent open periods of the write gate 230 required to write each ammonite cycle 304 depends on the limitations of the system, including the total pattern write time of the ammonite cycle 304 and the limit on continuous writes for the HAMR writing elements in the storage device 200.

Figure 8:
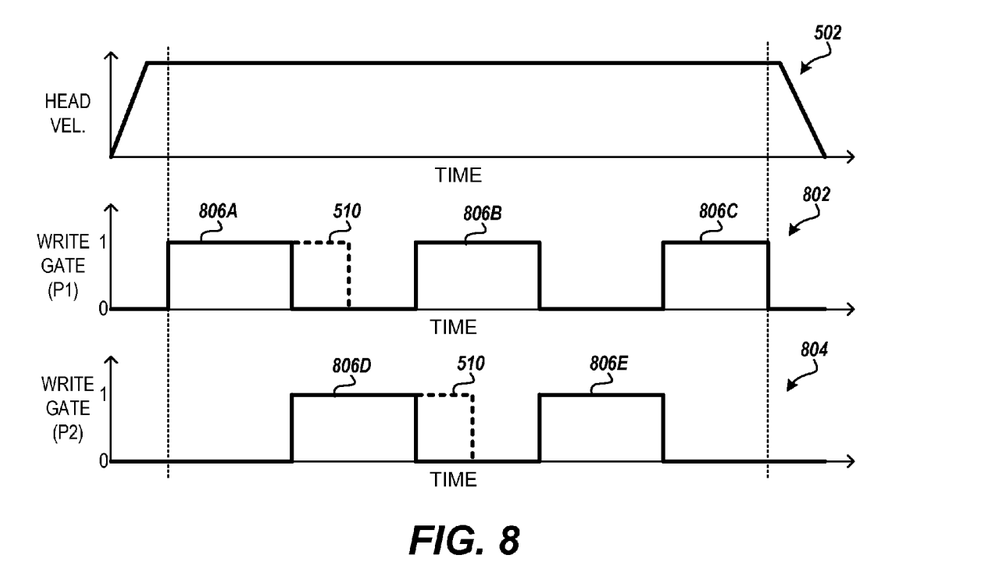
FIG. 8 is a timing diagram showing aspects of another method for writing servo reference patterns in a storage device implementing heat-assisted magnetic recording, according to embodiments described herein.
Figure 9:
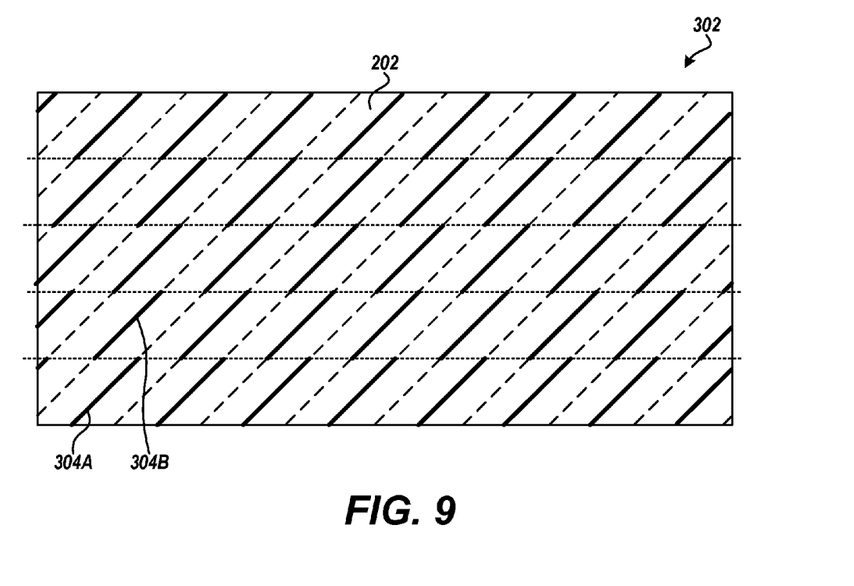
FIG. 9 is a block diagram showing an illustrative layout of ammonite servo reference patterns written to the disk media utilizing methods described herein.

According to further embodiments, in order to eliminate those areas of the recording surface 202 where the ammonite reference pattern 302 is blank, the ammonite cycles 304 may be written in multiple passes, each pass having complimentary patterns written to the surface. FIG. 8 shows a timing diagram for this approach. As may be seen in the figure, a first intermittent signal 802 is applied to the write gate 230 during the first pass write (P1) of the ammonite cycle 304A, and a second, complimentary intermittent signal 804 is applied to the write gate during the second pass write (P2) of the ammonite cycle 304B. As further shown in the figure, each open period of the write gate 230, shown at 806A-806E, is shorter than the HAMR continuous write time limit 510.

While the ammonite reference pattern writing method illustrated in FIG. 8 results in twice as many ammonite cycles 304 being written to the recording surface 202, the method produces complete coverage of the ammonite reference patterns 302 on the surface while remaining compatible with servo track writers in storage devices 200 implementing HAMR. It will be appreciated that any sequence of passes for writing the complimentary ammonite cycles 304A and 304B may be utilized. For example, all P1 ammonite cycles 304A may be written first, followed by all P2 ammonite cycles 304B. Alternatively, the method may write P1 ammonite cycles 304A and P2 ammonite cycles 304B alternately until all ammonite cycles have been written. It will be further appreciated that any number of different passes with different intermittent write gate signals may be utilized to write the ammonite reference patterns 302 to the recording surfaces 202 beyond the two shown in FIG. 8 and described herein.

Based on the foregoing, it will be appreciated that technologies for writing servo reference patterns in a storage device implementing heat-assisted magnetic recording are presented herein. While embodiments are described herein in regard to an HDD apparatus, it will also be appreciated that the embodiments described in this disclosure may be utilized by any storage device implementing a servo system similar to that described above. This may include a magnetic disk drive, a hybrid magnetic and solid state drive, an optical disk drive, and the like. The above-described embodiments are merely possible examples of implementations, merely set forth for a clear understanding of the principles of the present disclosure.

The logical operations, functions or steps described herein as part of a method, process or routine may be implemented (1) as a sequence of processor-implemented acts, software modules or portions of code running on a controller or computing system and/or (2) as interconnected machine logic circuits or circuit modules within the controller or computing system. The implementation is a matter of choice dependent on the performance and other requirements of the system. Alternate implementations are included in which operations, functions or steps may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Many variations and modifications may be made to the above-described embodiments without departing substantially from the spirit and principles of the present disclosure. Further, the scope of the present disclosure is intended to cover any and all combinations and sub-combinations of all elements, features and aspects discussed above. All such modifications and variations are intended to be included herein within the scope of the present disclosure, and all possible claims to individual aspects or combinations of elements or steps are intended to be supported by the present disclosure.

What is claimed is:

1. A method for writing servo reference patterns to a recording surface of a disk in a storage device, the method comprising steps of:
    generating a recording signal for a servo reference pattern through a read/write channel to a read/write head of the storage device;
    moving the read/write head across the recording surface as the disk is rotated; and
    applying an intermittent signal to a write gate interposed between the read/write channel and the read/write head so that a maximum continuous writing time of the recording signal does not exceed a continuous write time limit of the storage device.

2. The method of claim 1, wherein the servo reference pattern comprises a plurality of ammonite cycles.

3. The method of claim 2, wherein a first ammonite cycle of the plurality of ammonite cycles is written to the recording surface while a first intermittent signal is applied to the write gate, and a second ammonite cycle of the plurality of ammonite cycles is written to the recording surface while a second intermittent signal is applied to the write gate, the second intermittent signal being complimentary to the first intermittent signal.

4. The method of claim 1, wherein the storage device implements Heat-Assisted Magnetic Recording ("HAMR").

5. The method of claim 1, wherein the read/write head is moved across the recording surface by an actuator implemented in the storage device.

6. The method of claim 1, wherein the servo reference pattern is utilized by a servo track writer module of the storage device to write final servo patterns to the recording surface.

7. The method of claim 1, wherein the storage device is a hard-disk drive apparatus.

8. A servo track writing device comprising:
    a processor; and
    a memory operably connected to the processor and containing a servo writer module configured to
        generate a recording signal for a servo reference pattern through a read/write channel of a hard disk drive ("HDD") apparatus to a read/write head, the HDD apparatus implementing Heat-Assisted Magnetic Recording ("HAMR"), move the read/write head across a recording surface of a disk in the HDD apparatus as the disk is rotated, and apply an intermittent signal to a write gate interposed between the read/write channel and the read/write head so that a maximum continuous writing time of the recording signal does not exceed a HAMR continuous write time limit of the HDD apparatus.

9. The servo track writing device of claim 8, wherein the servo reference pattern comprises a plurality of ammonite cycles written in spiral lines from an outer diameter of the recording surface to an inner diameter of the recording surface.

10. The servo track writing device of claim 9, wherein a first ammonite cycle of the plurality of ammonite cycles is written to the recording surface while a first intermittent signal is applied to the write gate, and a second ammonite cycle of the plurality of ammonite cycles is written to the recording surface while a second intermittent signal is applied to the write gate, the second intermittent signal being complimentary to the first intermittent signal.

11. The servo track writing device of claim 8, wherein the read/write head is moved across the recording surface by an actuator implemented in the HDD apparatus.

12. The servo track writing device of claim 8, wherein the servo track writing device is integrated within a controller of the HDD apparatus.

13. The servo track writing device of claim 12, wherein the servo writer module is further configured to write final servo patterns to the recording surface based on the servo reference patterns.

14. A non-transitory computer-readable medium having processor-executable instructions stored thereon that, when executed by a processor operably connected to a storage device, cause the processor to:

generate a recording signal for a servo reference pattern through a read/write channel of the storage device to a read/write head of the storage device;

move the read/write head across a recording surface of a disk of the storage device as the disk is rotated; and apply an intermittent signal to a write gate interposed between the read/write channel and the read/write head so that a maximum continuous writing time of the recording signal does not exceed a continuous write time limit of the storage device.

15. The computer-readable medium of claim 14, wherein the servo reference pattern comprises a plurality of ammonite cycles.

16. The computer-readable medium of claim 15, having further processor-executable instructions stored thereon that cause the processor to:

apply a first intermittent signal to the write gate during the write of a first ammonite cycle of the plurality of ammonite cycles; and apply a second intermittent signal to the write gate during the write of a second ammonite cycle of the plurality of ammonite cycles, the second intermittent signal being complimentary to the first intermittent signal.

17. The computer-readable medium of claim 14, wherein the storage device implements Heat-Assisted Magnetic Recording ("HAMR").

18. The computer-readable medium of claim 14, wherein the read/write head is moved across the recording surface by an actuator implemented in the storage device.

19. The computer-readable medium of claim 14, wherein the servo reference pattern is utilized by a servo track writer module of the storage device to write final servo patterns to the recording surface.

20. The computer-readable medium of claim 14, wherein the storage device is a hard-disk drive ("HDD") apparatus.

* * * * *